United States Patent [19]
Antonoplos et al.

[11] 4,337,110
[45] Jun. 29, 1982

[54] LAMINATES PREPARED FROM SOLUTIONS OF RESINS CONTAINING AMIC ACID GROUPS

[75] Inventors: Patricia A. Antonoplos; William J. Heilman, both of Houston, Tex.

[73] Assignee: Gulf Oil Corporation, Pittsburgh, Pa.

[21] Appl. No.: 900,671

[22] Filed: Apr. 27, 1978

Related U.S. Application Data

[62] Division of Ser. No. 794,902, May 9, 1977, Pat. No. 4,133,792.

[51] Int. Cl.³ ............................................. C09J 5/02
[52] U.S. Cl. ............................ 156/307.4; 156/307.5; 156/331.1; 427/389.8; 428/302; 428/435; 428/473.5; 528/205; 524/726; 524/729; 524/753; 524/879
[58] Field of Search ................. 156/331, 307.4, 307.5, 156/331.1; 427/390 A; 428/302, 474, 435, 473.5; 260/30.2, 78.41, 47 UA, 474 CP; 526/11.1; 528/205

[56] References Cited

U.S. PATENT DOCUMENTS

| 3,073,784 | 1/1963 | Endrey | 260/30.2 |
| 3,247,165 | 4/1966 | Rodia | 260/30.2 |
| 3,496,132 | 2/1970 | Boldebuck et al. | 260/30.2 |
| 3,654,227 | 4/1972 | Pine-Hart | 428/474 |
| 3,845,018 | 10/1974 | Bilow et al. | 260/47 CZ |
| 4,097,456 | 6/1978 | Barie | 428/474 |

Primary Examiner—John J. Gallagher
Attorney, Agent, or Firm—Richard L. Kelly

[57] ABSTRACT

The applicants have provided laminates prepared by (a) impregnating a glass fabric with an N-methyl-2-pyrrolidone solution of a compound having the structure of Formula A shown in FIG. 1 of the drawings, (b) heating the impregnated glass fabric to remove solvent therefrom and to covert the amic acid groups to imide groups, and (c) assembling a plurality of the impregnated glass fabrics from (b) and heating the assembly under pressure to a temperature in the range of 177°–260° C.

2 Claims, 2 Drawing Figures

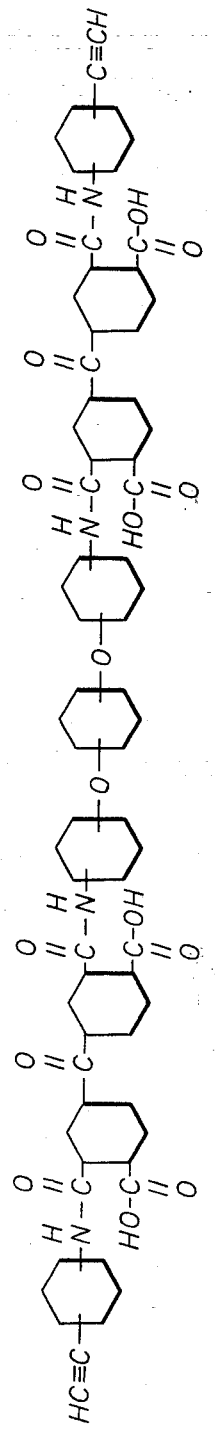
FIG.1 (FORMULA A)
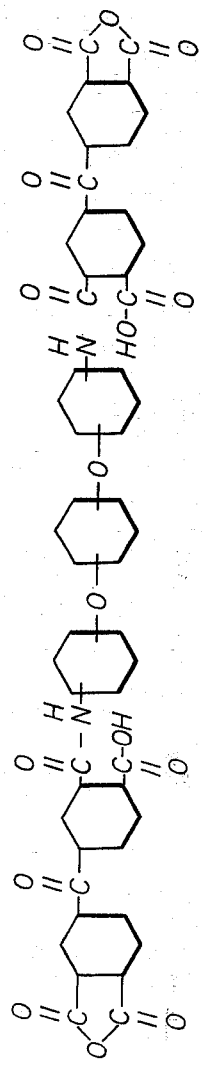
FIG.2 (FORMULA B)

LAMINATES PREPARED FROM SOLUTIONS OF RESINS CONTAINING AMIC ACID GROUPS

This is a division of application Ser. No. 794,902 filed May 9, 1977, now U.S. Pat. No. 4,133,792.

BACKGROUND OF THE INVENTION

The prior art, notably U.S. Pat. No. 3,845,018 to N. Bilow et al, and U.S. Pat. No. 3,879,349, also to N. Bilow et al, disclose certain acetylene-substituted polyimide oligomers and describe methods for their preparation. The polyimide oligomers are very useful as heat-curable molding powders, coatings on wires or other substances, as adhesives, or as laminating resins. The heat cured product as taught in the '018 patent, column 1, lines 50 et seq., has a very low void content as well as excellent thermal and physical properties. A method of homopolymerizing the acetylene-substituted polyimide oligomers described in the '018 patent can be found in the teachings of the '349 patent referred to above.

The method of preparation of the acetylene-substituted polyimide oligomers is described in the '018 patent and is a multi-step procedure involving the initial reaction of an aromatic tetracarboxylic acid dianhydride such as benzophenone tetracarboxylic acid dianhydride with an aromatic diamine in dimethyl formamide (DMF) at reflux temperature. The product initially formed is an anhydride capped polyamic acid, with some percentage of the amic acid groups being converted to imide groups at the prevailing high temperature.* This intermediate product subsequently is reacted with an amino-arylacetylene in dimethyl formamide at reflux temperature to produce an acetylene-terminated polyamic acid oligomer. Again, by reason of the prevailing high temperature, some of the amic acid groups are converted to imide groups. In accordance with the teachings of the cited prior art, the dimethyl formamide solvent then is removed before the remainder of the amic acid groups of the acetylene-terminated polyamic acid oligomer are converted to the desired imide groups (see col. 4 of the '018 reference, lines 31-33, and the working Examples). The solvent-free oligomer then is diluted with imidization agents such as acetic anhydride or a benzene-cresol mixture.

*The formation of imide groups generates water which can react with the anhydride groups to reduce yields and cause formation of chemicals not having the desired structure.

No reason is given for the removal of the DMF from the oligomer before imidization, but, an "imidization" agent as noted is added, presumably to aid in the removal of the water of imidization and thus drive the reaction to completion. When the imidization agent is benzene-cresol, the benzene is used to form an azeotrope with water. The function of the cresol is not specified by Bilow et al in their patents. Since the DMF is removed from the acetylene-capped oligomers, the cresol is believed to function as a solvent for the oligomers to aid in the imidization reaction. The acetic anhydride can serve as both a solvent and water removal agent. In any event, the separate removal of DMF before imidization is an added burden on the process, especially since it is removed in a rotary evaporator requiring considerable energy input and time.

One of the desirable properties of the acetylene-substituted polyimide oligomers is that on curing they have very low void contents, giving rise to excellent thermal and physical properties. It has been found that the ability of the finally cured resin to operate at high temperatures (over 485° F. (252° C.)) for extended periods of time is a direct function of the history of the post-cure temperatures to which the resin is subjected. Thus if the finally cured resin is expected to perform well at temperatures in the 500° to 700° F. (260° to 371° C.) range, then post-curing of the resin also must occur at temperatures of about the same range. It has been observed that when the prior art acetylene-substituted polyimide oligomers are post-cured at temperatures above about 485° F. (252° C.), fracturing or blistering of the resin or laminates prepared therefrom may occur. The reason for failure was found to be the evolution of dimethyl formamide from the resin at temperatures exceeding 485° F. (252° C.), despite the fact that dimethyl formamide has a boiling point of about 302° F. (150° C.), and thus should have been removed by simple distillation or evaporation earlier in the processing sequence. It is theorized that somehow the DMF solvent is coordinating or reacting with components of the acetylene-substituted polyimide oligomers and is not being removed at the expected conditions as taught in the prior art. Extended drying times cannot be employed, as this tends to prematurely cure the oligomers. Even if it were possible to extend the drying time, the dimethyl formamide may well not be removed since heating at 485° F. (252° C.) indicates no DMF was present in a gas stream being analyzed by a pyrolysisgas chromatography-mass spectrometry system.

In the application of Walter Barie, Jr., Ser. No. 782,001, filed on Mar. 28, 1977 now U.S. Pat. No. 4,097,456 (assigned to the assignee of the present application), it was proposed to overcome the above described problems by preparing the acetylene-substituted polyimide oligomers by carrying out all of the reactions, including the final imidization reaction, in N-methyl-2-pyrrolidone (NMP).* The product thus obtained can be cured at temperature above 485° F. (252° C.) without encountering the fracturing and blistering associated with the product prepared in dimethyl formamide.

*In this method, the applicant runs all of the reaction steps at about 150° C. or higher. Thus, imide groups are prepared throughout all of the reaction steps with the liberation of water, which causes undesired complications for reasons previously discussed.

A severe limitation of the acetylene-substituted polyimide oligomers is that they have a very low solubility in all known solvents, the maximum solubility being approximately 5 weight % in NMP at 25° C. For this reason it is difficult to impregnate glass fabrics with high loadings of the acetylene-substituted polyimide oligomers which are required to prepare heat-cured laminates of optimum properties.

There is a need in the art for compositions having the desirable properties of the acetylene-substituted polyimide oligomers, but which can be prepared at lower cost and which can be prepared in the form of solutions having a high concentration of resin solids.

SUMMARY OF THE INVENTION

The applicants have discovered that they can prepare polyamic acids consisting virtually exclusively of compounds conforming to Formula A shown in FIG. 1 with substantially no concomitant production of chemicals having imide groups therein by preparing such compounds under carefully controlled conditions. The products of Formula A have high solubilities in a selected group of solvents, including N-methyl-2-pyrrolidone, cyclohexanone, diethyl carbonate and gamma-butyrolactone. Glass fabric laminates having high loadings of resin can be prepared by impregnating glass fabrics with a high solids solution of the product of Formula A and evaporating the solvent therefrom by heating to elevated temperatures. The resin-impregnated glass fabrics as above prepared are assembled and heated within defined heating cycles to produce cured laminates having excellent high temperature resistance and good physical properties.

THE DRAWINGS

The drawings set forth two chemical formulae.

Formula A (FIG. 1) represents the structure of the products of the invention, while Formula B (FIG. 2) represents the structure of an intermediate compound employed in the manufacture of the products of Formula A.

DETAILED DESCRIPTION OF THE INVENTION

In the first step of the process of the invention, 3,3′,4,4′-benzophenonetetracarboxylic acid dianhydride (BTDA) is heated in one of the limited class of solvents previously described, preferably NMP, to prepare a solution containing a minimum of at least 17 weight % of BTDA. In this step of the process the BTDA should be dissolved in the solvent at a temperature substantially higher than will be employed in subsequent steps of the process. Typically the BTDA will be dissolved in the solvent at a temperature of at least 150° C. and temperatures as high as 200° C. can be employed. By operating at these temperatures, it is possible to dissolve substantially more BTDA than will dissolve at the reaction temperatures employed in subsequent steps of the process. Upon cooling such solutions to the lower temperatures subsequently employed in the reactions, it is observed that the BTDA does not precipitate but stays in solution, presumably by reason of super cooling.

The quantity of BTDA dissolved in the solvent will be dictated by the solids desired in the final resin solution and also by the quantity of solvent (if any) employed to dissolve the reactants employed in subsequent steps of the process. A minimum of 17 weight % BTDA is required to prepare a final resin solution containing 30 weight % resin solids. It is possible to prepare NMP solutions containing up to 50 weight % BTDA which remain liquid at a temperature of 50° C.

In the second step of the process, the hot solution of BTDA is cooled to the temperature which will be employed in the subsequent steps of the process. This temperature will be influenced by a multitude of factors. Temperatures as low as about 25° C. are sufficiently high to run the subsequent reactions, but somewhat higher temperatures may be required to maintain a sufficient quantity of BTDA in solution. Solutions of BTDA are quite viscous and increasing the temperature provides easier mixing of the reactants. Temperatures above 100° C. should be avoided, as the use of high temperatures promotes imidization of the amic acid groups present in the chemicals of Formula B, which imidization is undesirable for reasons previously discussed. A preferred temperature range for this step of the process is about 30°-100° C. and more especially about 45°-75° C.

After the BTDA solution has been adjusted to the appropriate temperature, a bis(aminophenoxy) benzene (APB), preferably 1,3-bis(3-aminophenoxy) benzene, is added in small increments to the BTDA solution with stirring. The APB will be added in a quantity corresponding to 0.5 molar portion per molar portion of BTDA. This reaction proceeds readily at the prevailing temperature and provides an intermediate product consisting almost exclusively of a chemical having the structure set forth in Formula B, illustrated in FIG. 1.

APB is a solid at ambient temperature and can be added in pure form, although frequently for convenience it will be dissolved in the solvent employed to dissolve the BTDA. Good stirring should be provided so that localized high concentrations of APB are avoided. Localized high concentrations of APB may cause the preparation of higher molecular weight products in which the APB reacts with BTDA in a 2:3 or 3:4 molar ratio rather than the desired 1:2 ratio. Such higher molecular weight products can be considered to be dimers and trimers of the compounds having the structure of Formula B. The reaction between BTDA and APB is exothermic and cooling should be provided to maintain the temperature within the limits previously discussed.

In the next step of the process an aminophenyl acetylene, preferably 3-aminophenylacetylene (APA), is added in small increments with stirring to the solvent solution of the intermediate product prepared in the previous step of the process. APA is a liquid at ambient temperature and can be added in pure form or as a concentrated solution in the solvent employed in the earlier steps of the process. Good stirring and cooling should be provided to maintain a reaction temperature within the limits previously described. The APA is added in a molar quantity equivalent to the molar quantity of BTDA charged to the first step of the process. The final product is a solution of a thermosetting resin consisting almost exclusively of a chemical having the structure of Formula A shown in FIG. 1. Any coproducts prepared are dimers or trimers of the product of Formula A and have a structure as set forth below:

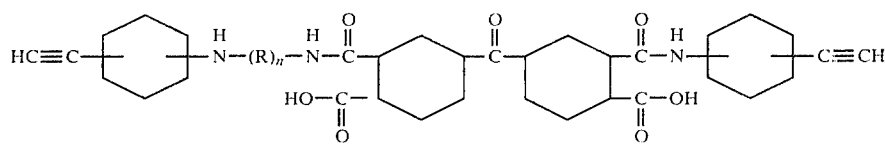

where R is

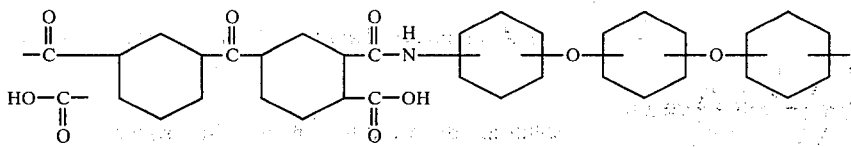

and n is a small integer such as 2 or 3.

As earlier noted, the applicants' ultimate product consists almost exclusively of a chemical having the structure of Formula A. The only coproducts are very minor concentrations of dimers and trimers of the product of Formula A. The product contains no detectible concentration of imide groups as determined by examination of the product's NMR spectrum. The product of the invention is very soluble in NMP, cyclohexanane, diethyl carbonate and gamma-butyrolactone. At ambient temperature 30 weight % solutions are viscous solutions resembling molasses in consistency. Fifty weight % solutions do not flow at ambient temperature, but can be poured at temperatures of 80° C. or higher.

The products of the invention can be heat cured to provide thermoset resins having properties equal to or superior to those disclosed by Bilow and Barie and previously referred to. When heated to temperatures of the order of 150° C., the products of the invention undergo an imidization reaction with the liberation of water to form acetylene substituted oligomers which are chemically indistinguishable from the products of Bilow and Barie.

When used as a coating material, the products of the invention should be laid down on the substrate and heat cured at temperatures of 175° C. or higher. To prepare laminates, the fabric should be impregnated with a solvent solution and heated to an elevated temperature for a time sufficient to convert the resin solids to imides and liberate water. Drying resin impregnated 181 glass cloth for 60 minutes at 150° C. or 80 minutes at 135° C. in a circulating air oven is usually sufficient. The dried fabrics then can be laid up and heated under pressure to cross-link the resin solids. Modest pressures of the order of 15–200 psig are sufficient. Curing temperatures of the order of 177°–260° C. and preferably 195°–220° C. are employed for curing times of the order of 1–12 hours. Optimum properties are developed by post curing the laminates for periods of 16–48 hours at temperatures of about 260°–375° C.

The following examples are set forth to illustrate the principle and practice of the invention to those skilled in the art. Where parts and percentages are set forth, unless otherwise noted, they are parts and percentages expressed on a weight basis.

EXAMPLE 1

A reaction vessel equipped with a high powered stirrer was charged with 40 ml of NMP and 32.2 grams (0.1 mole) of BTDA. The mixture was heated to 150° C. with stirring until all of the BTDA was dissolved. The solution then was cooled to 60° C. A solution of 14.6 grams (0.05 mole) of APB dissolved in 20 ml of NMP was added drop wise over a one hour period. Cooling was provided to maintain the reaction temperature at 60° C. APA in the amount of 11.7 grams (0.1 mole) then was added drop wise with stirring over a period of about one hour while maintaining the reaction temperature at 60° C. The product was a solution containing approximately 49 weight % of a chemical having the structure of Formula A dissolved in NMP. The NMR spectrum of the product indicated that it contained no detectible quantity of imide groups.

EXAMPLE 2

Six inch squares of 181 E glass cloth fabric (with an A-1100 finish) was painted with the resin solution of Example 1 to thoroughly impregnate the glass fabric. These samples then were dried for three minutes in a circulating air oven at 150° C. The specimens were again painted with the resin solution of Example 1 and dried as previously described.

A specimen of the dried fabric was extracted with NMP for chromatographic, NMR and I.R. analysis. The extracted product contained no evidence of carboxyl groups thus indicating that all of the amic acid groups had been converted to imide groups.

EXAMPLE 3

Six pieces of the resin impregnated glass fabric from Example 2 were laid up in the form of a laminate, placed in a press under a pressure of 200 psig, and heated for two hours at 250° C. The laminate was medium brown in color and contained approximately 25 weight % resin. The laminate then was postcured for four hours at 650° F. (343° C.) and then an additional 15 hours at 700° F. (370° C.). No blisters or voids were present in the postcured laminates.

We claim:

1. A method for preparing a cured resin impregnated glass fabric laminate which consists essentially of:
   a. impregnating a glass fabric with a solution of a heat curable resin containing amic acid groups,
   b. heating the impregnated glass fabric of step (a) to an elevated temperature to remove the solvent therefrom and to convert the amic acid groups of the resin solids to imide groups, and
   c. assembling a plurality of impregnated glass fabrics from step (b) and heating said assembly under pressure to a temperature in the range of about 177°–260° C., the resin solution of step (a) consisting essentially of at least 30 weight % of heat curable resin solids dissolved in a solvent selected from the group consisting of N-methyl-2-pyrrolidone, cyclohexanone, diethyl carbonate, and gamma-butyrolactone, said heat curable resin solids consisting predominantly of a chemical compound having the structure:

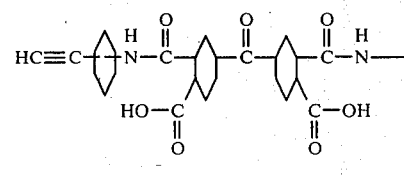

-continued
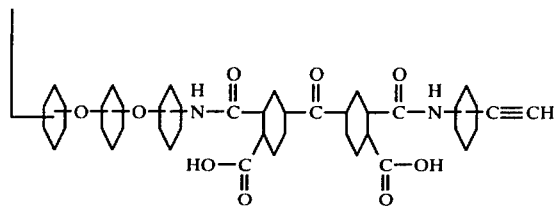
2. A method of claim 1 in which the heat curable resin solids are dissolved in N-methyl-2-pyrrolidone.
* * * * *